Moore & Hanyan,
Water Gate.
N° 13,319. Patented July 24, 1855.

UNITED STATES PATENT OFFICE.

E. N. MOORE, OF LENOX, PENNSYLVANIA, AND I. H. HANYAN, OF CHESTER, NEW YORK.

BALANCE WATER-GATE.

Specification of Letters Patent No. 13,319, dated July 24, 1855.

*To all whom it may concern:*

Be it known that we, E. N. MOORE, of Lenox, in the county of Susquehanna and State of Pennsylvania, and ISAAC H. HANYAN, of Chester, in the county of Orange and State of New York, have invented a new and Improved Balance Water-Gate; and we do hereby declare that the following is a full, clear, and exact description of the same, reference being had to the annexed drawings, making a part of this specification, in which—

Figure 2:
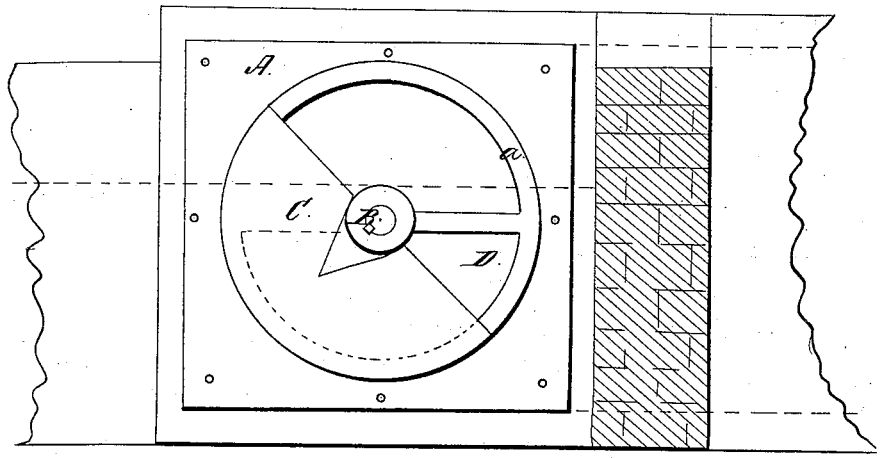
Figure 1:
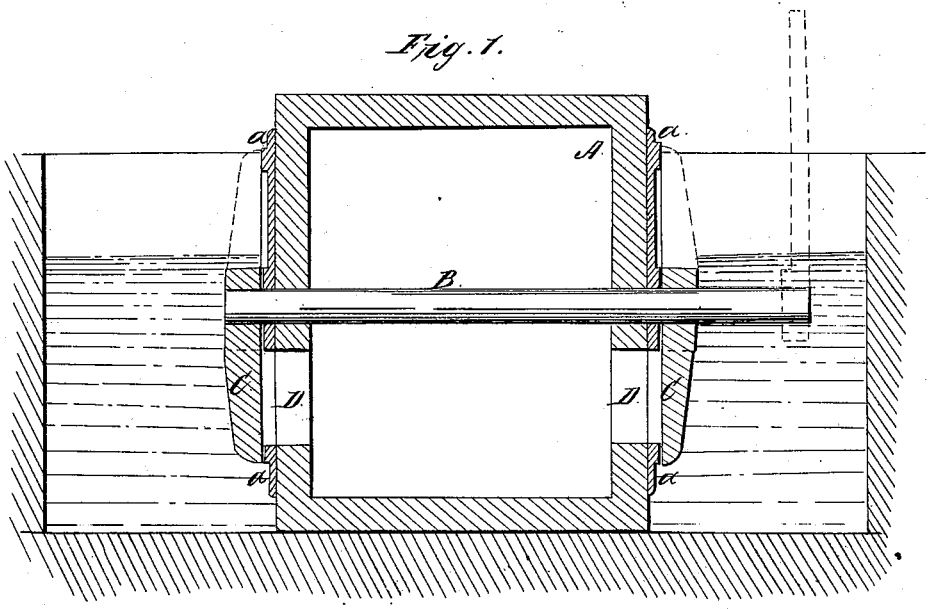

Figure 1, is a transverse section of my improvement. Fig. 2, is a side view of ditto.

Similar letters of reference indicate corresponding parts in the two figures.

This invention relates to a new and improved balance water gate, for penstocks, flumes, ponds, etc., and consists in having two gates which are placed, one at each end of a shaft which passes transversely through a box or flume; the gates and shaft rotate, the gates working over apertures in the sides of the box, one gate neutralizing the pressure of the water upon the other as will be presently shown and described.

A, represents a box or flume one end of which passes into the penstock or pond. This box has a shaft B, running transversely through it, as shown in Fig. 1. At each end of the shaft B, there is attached a semi-circular disk or plate C. These disks or plates work against annular projections (a) on the outer sides of the box A. Through the sides of the box A, within the annular projections (a) there are made semi circular openings D.

The disks or plates C, are firmly attached to the shaft B, and turn with it and the disks or plates are placed upon the shaft B, so as to bear water tight against the projections (a). The disks are opened by turning the shaft B, till the semi-circular disks or plates C, C, are turned above the openings D, D, and the apertures are covered by turning the disks or plates over the openings D. There will be no friction in consequence of the disks bearing against the projections (a) because the pressure of the water against one disk, will counteract the pressure of the water against the opposite disk. The shaft B, therefore may be operated or turned with little power, and the gate opened and closed with the greatest facility.

Although semicircular disks are shown and described, and also semicircular openings, still circular disks may be used with sector recesses or slots cut in them, similar to an ordinary hot air register, various forms however may be used.

What we claim as new and desire to secure by Letters Patent, is—

Constructing a water gate, by having two disks or plates C, C, of proper form attached to opposite ends of a shaft B, which passes transversely through a box A, said disk bearing against projections (a) (a) on the sides of the box and over openings D, in the sides of said box substantially as herein shown and described.

E. N. MOORE.
I. H. HANYAN.

Witnesses:
ROBERT FERRIER,
MILTON BARNES.